United States Patent
Tong et al.

(10) Patent No.: US 10,832,450 B2
(45) Date of Patent: Nov. 10, 2020

(54) SEMANTIC PRESERVED STYLE TRANSFER

(71) Applicant: GM Global Technology Operations LLC, Detroit, MI (US)

(72) Inventors: Wei Tong, Troy, MI (US); Chengqi Bian, Troy, MI (US); Farui Peng, Sterling Heights, MI (US); Shuqing Zeng, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 20 days.

(21) Appl. No.: 16/366,393

(22) Filed: Mar. 27, 2019

(65) Prior Publication Data

US 2020/0311986 A1    Oct. 1, 2020

(51) Int. Cl.
| | |
|---|---|
| *G06T 11/00* | (2006.01) |
| *B60R 11/04* | (2006.01) |
| *G06T 5/00* | (2006.01) |
| *G06T 5/50* | (2006.01) |
| *G06N 20/20* | (2019.01) |
| *G06N 3/04* | (2006.01) |
| *G06N 3/08* | (2006.01) |

(52) U.S. Cl.
CPC ............ *G06T 11/001* (2013.01); *B60R 11/04* (2013.01); *G06N 3/0454* (2013.01); *G06N 3/08* (2013.01); *G06N 20/20* (2019.01); *G06T 5/001* (2013.01); *G06T 5/50* (2013.01)

(58) Field of Classification Search
CPC ......... G06T 11/001; G06T 5/001; G06T 5/50; B60R 11/04; G06N 20/20; G06N 3/0454; G06N 3/08
See application file for complete search history.

(56) References Cited

U.S. PATENT DOCUMENTS

| | | | | |
|---|---|---|---|---|
| 10,496,809 | B1* | 12/2019 | Pham | .................... H04L 63/102 |
| 10,614,207 | B1* | 4/2020 | Truong | .................. G06T 11/00 |
| 10,657,676 | B1* | 5/2020 | Rehfeld | ................. G06T 9/002 |
| 2018/0357800 | A1* | 12/2018 | Oxholm | ................. G06N 3/084 |
| 2019/0049540 | A1* | 2/2019 | Odry | .................... G06N 3/0454 |
| 2020/0126584 | A1* | 4/2020 | Huang | ................ G10L 15/1815 |

* cited by examiner

*Primary Examiner* — Bobbak Safaipour
(74) *Attorney, Agent, or Firm* — Quinn IP Law

(57) ABSTRACT

A method for image style transfer using a Semantic Preserved Generative Adversarial Network (SPGAN) includes: receiving a source image; inputting the source image into the SPGAN; extracting a source-semantic feature data from the source image; generating, by the first decoder, a first synthetic image including the source semantic content of the source image in a target style of a target image using the source-semantic feature data extracted by the first encoder of the first generator network, wherein the first synthetic image includes first-synthetic feature data; determining a first encoder loss using the source-semantic feature data and the first-synthetic feature data; discriminating the first synthetic image against the target image to determine a GAN loss; determining a total loss as a function of the first encoder loss and the first GAN loss; and training the first generator network and the first discriminator network.

20 Claims, 2 Drawing Sheets

SEMANTIC PRESERVED STYLE TRANSFER

INTRODUCTION

The present disclosure relates to a method and system for semantic preserved style transfer, and more particularly, for image style transfer using a Semantic Preserved Generative Adversarial Network (SPGAN).

One of the key challenges for style transfer is to identify what the content is in the source and what the style is in the target domain. For example, the content in the source domain might be cars, buildings, trees, etc., while the style in the target domain is the white balance, color saturation, image brightness, etc. During a style transfer, if the content is well preserved after the style transfer then, the features extracted before and after the style transfer should be the same. Therefore, there is a need for a content-aware encoder loss for a multi-stage generator based on the SPGAN's architecture that preserves the semantic content during an image style transfer.

SUMMARY

The present disclosure generally relates to a method and system for semantic preserved style transfer using a Semantic Preserved Generative Adversarial Network (SPGAN) or any other suitable network, such as a Generative Adversarial Network (GAN). The presently disclosed method is able to preserve the semantic content for style transfer while minimize image distortion. The presently disclosed method (i.e., machine learning method) also accelerates the training process when compared with other existing methods.

This method introduces a new content-aware encoder loss in the generator stage to extract the content-aware features from both the images before and after transformation and may adopt a multi-stage generator to enhance the complexity of representation. The content-aware encoder loss provides more constraints to the solution domain, which stabilizes and accelerates the total training process. The system provides a new SPGAN architecture that uses a new content-aware encoder loss. The presently disclosed SPGAN architecture integrates the new encoder loss together with the generator loss, identity loss, and cycle consistency loss to speed up the training. The system may adopt a multi-stage generator architecture to enhance the complexity of the encoder and improve the performance of fine-grained content details.

In an aspect of the present disclosure, the method for image style transfer using a SPGAN includes: receiving, by a processor, a source image, wherein the source image was captured by a camera, the source image includes a source semantic content, and the source semantic content is objects in the source image and an arrangement of the objects in the source image; inputting the source image into the SPGAN, wherein the SPGAN includes a first generator network including a first encoder and a first decoder, and a first discriminator network, wherein the SPGAN runs on the processor; extracting, by the first encoder of the first generator network, a source-semantic feature data from the source semantic content of the source image; generating, by the first decoder of the first generator network, a first synthetic image including the source semantic content of the source image in a target style of target images using the source-semantic feature data extracted by the first encoder of the first generator network, wherein the target style is a spatially-average colors and a texture of the target images, and the first synthetic image includes first-synthetic feature data; determining, by the processor, a first encoder loss using the source-semantic feature data and the first-synthetic feature data; discriminating, using the first discriminator network, the first synthetic image generated by the first generator network against the target images to determine a GAN loss; determining a total loss as a function of the first encoder loss and the first GAN loss; and training, by the processor, the first generator network and the first discriminator network using the first encoder loss and the first GAN loss until the total loss is equal to or less than a predetermined loss threshold in order to minimize image distortion during the image style transfer. In the depicted embodiment, the SPGAN is a Semantic Preserved Generative Adversarial Network (SPGAN).

The method may further include receiving, by the processor, the target image. The method may further include inputting the first synthetic image into a second generator network. The second generator network includes a second encoder and a second decoder. The first synthetic image has a first-synthetic semantic content, and the first-synthetic semantic content is objects in the first synthetic image and an arrangement of the objects in the first synthetic image.

The method may further include extracting, by the second encoder of the second generator network, a first-synthetic feature data from a first-synthetic semantic content of the first synthetic image. The method may further include generating, by the second decoder of the second generator network, a second synthetic image including the first-synthetic semantic content of the first synthetic image in a source style of the source images using the first-synthetic feature data extracted by the second encoder of the second generator network. The source style is a spatially-average colors and a texture of the source image, wherein the second synthetic image has a second-synthetic feature data.

The method may further include determining, by the processor, a second encoder loss using the first-synthetic feature data and the second-synthetic feature data. The total loss is a function of the first encoder loss, the second encoder loss, the first GAN loss, etc.

The method may further include determining a cycle loss using the second-synthetic feature data and a source image synthetic data. The total loss is a function of the first encoder loss, the second encoder loss, the first GAN loss, the second GAN loss, the cycle loss, etc.

The method may further include inputting the second synthetic image into the second generator network. The camera used to capture the source image may be part of a vehicle.

In another aspect of the present disclosure, a system for image style transfer using a SPGAN includes a plurality of sensors and a processor in communication with the plurality of sensors. At least one of the sensors is a camera. The processor is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
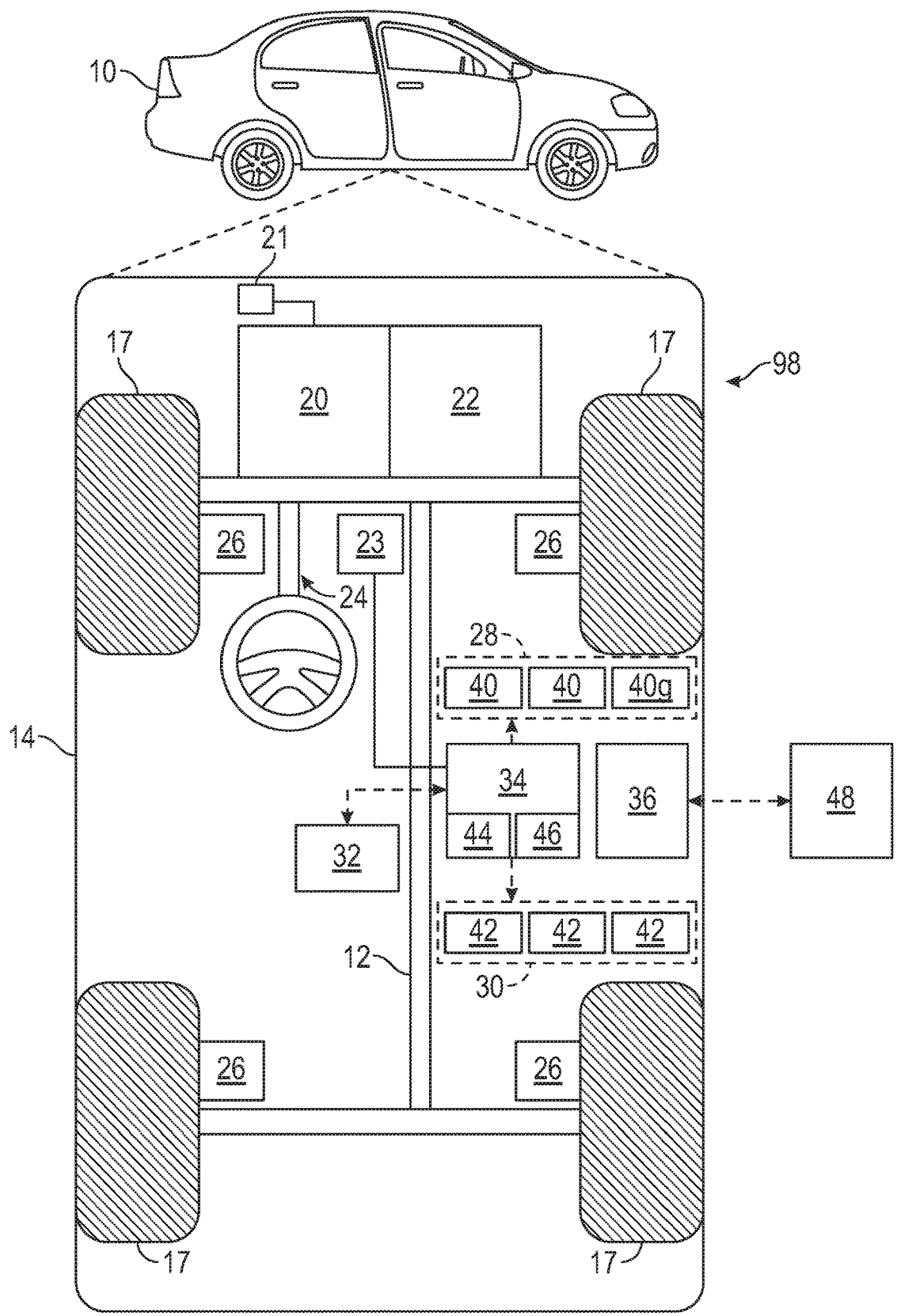
FIG. 1 is a schematic block diagram of a vehicle.

As depicted in FIG. 1, the vehicle 10 generally includes a chassis 12, a body 14, front and rear wheels 17 and may be referred to as the host vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle and a control system 98 is incorporated into the vehicle 10. The control system 98 may be simply referred to as the system. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 may include, but are not limited to, radars, lidars, global positioning systems, one or more cameras (e.g., optical cameras and/or thermal cameras), ultrasonic sensors, and/or other sensors. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensing system 24 includes one or more Global Positioning System (GPS) transceiver 40g configured to detect and monitor the route data (i.e., route information). The GPS transceiver 40g is configured to communicate with a GPS to locate the position of the vehicle 10 on the globe. The GPS transceiver 40g is in electronic communication with the controller 34. Because the sensor system 28 provides object data to the controller 34, the sensory system 28 and its sensors 40 are considered sources of information (or simply sources).

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98 and. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured receive inputs from the user via the user interface 23. The user interface 23 includes a display configured to display information to the user (e.g., vehicle operator or passenger).

Figure 2:
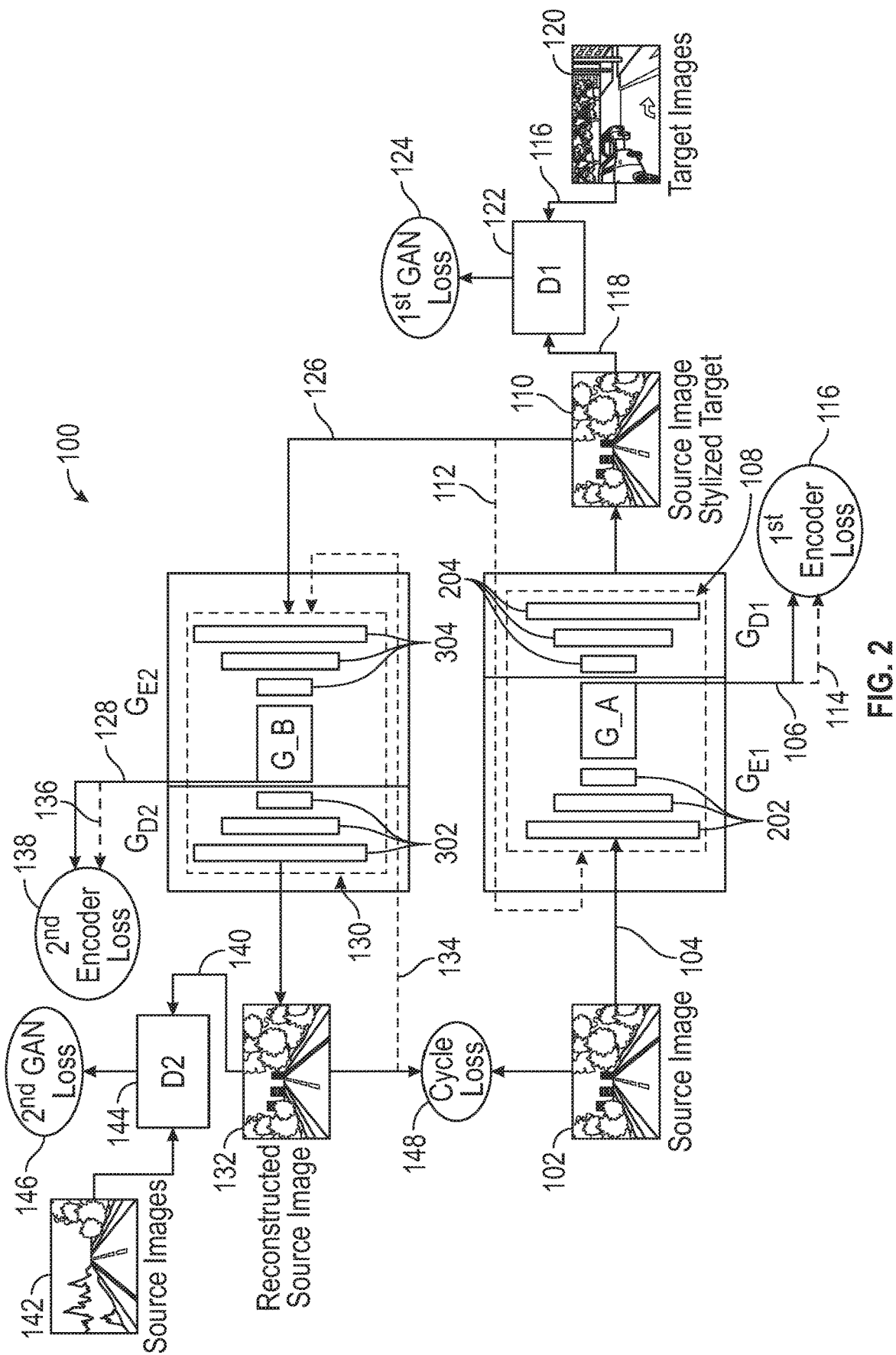
FIG. 2 is a SPGAN architecture that is illustrative of a method for image style transfer using the SPGAN.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 98, which is configured to control the vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include an internal combustion engine and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors configured to measure the speed (or velocity) of the vehicle 10. The speed sensor is coupled to the controller 34 and is in electronic communication with one or more wheels 17.

With reference to FIG. 2, a method 100 for image style transfer a SPGAN (e.g., Cycle Generative Adversarial Network (CycleGAN)). The processor 44 is programmed to execute instructions of the method 100 stored on the non-transitory computer readable storage media 46. In other words, the processor 33 is programmed to execute the method 100. The method 100 begins at block 102. At block 102, the processor 33 receives a source image. The source image was captured by the camera (i.e., one of the sensors 40). The source image includes source image data. The source image includes a source semantic content. The term "semantic content" means objects (e.g., cars, building, trees, etc.) in the source image and the arrangement of the objects in an image. Thus, the term "source semantic content" means objects (e.g., cars, building, trees, etc.) in the source image and the arrangement of the objects in the source image. The semantic content includes source-semantic feature data. The term "source-semantic feature data" means data about the source semantic content of the source image. After block 102, the method 100 proceeds to block 104.

At block 104, the processor 44 inputs the source image into the SPGAN. The SPGAN runs on the processor 44. The SPGAN includes a first generator network G_A. The first generator network G_A including a first encoder $G_{E1}$ and a first decoder Gm. The first encoder $G_{E1}$ encodes the content of the input image and generates the features of the source image. The first encoder $G_{E1}$ decodes the features of the source image and applies the style of target images to generate the styled synthetic image. The first encoder $G_{E1}$ has a plurality of first encoder layers 202, and the first decoder Gm has a plurality of first decoder layers 204. Each first encoder layer 202 performs convolution with a filter bank to produce a set of feature maps. The first decoder $G_{D1}$ receives the feature maps from the first encoder $G_{E1}$ and produces styled synthetic image. At block 104, the processor 44 inputs the source image into the first encoder $G_{E1}$ of the first generator network G_A. At this point, the first encoder $G_{E1}$ encodes the content of the input image and generates the features of the source image.

The SPGAN also includes a second generator network G_B. The second generator network G_B includes a second encoder $G_{E2}$ and a second decoder $G_{D2}$. The second encoder $G_{E2}$ encodes the content of the first synthetic image and generates the features of the first synthetic image. The second encoder $G_{E2}$ has a plurality of second encoder layers 304, and the second decoder $G_{D2}$ has a plurality of second decoder layers 302. Each second encoder layer 302 performs convolution with a filter bank to produce a set of feature maps. The second decoder $G_{D2}$ receives the feature maps from the second encoder $G_{E2}$ and produces reconstructed source image. Each of the first generator network G_A and second generator network G_B are convolutional neural networks.

The SPGAN also includes a first discriminator network D1. Further, the first discriminator network D1 compares a first synthetic image generated by the first generator network G_A with target images to determine whether first synthetic image is real or fake. Accordingly, the SPGAN tries to "fool" the first discriminator network D1 by producing a synthetic image that appear to have come from a true data distribution of the target image domain (i.e., an image captured by a camera). During training of the SPGAN, the first discriminator network D1 learns to distinguish the synthetic image generated by the first generator network G_A from the real images in the target domain. During training, the first generator network G_A learns a mapping from the source image to the target style and trains to produce target samples that fool an adversarial discriminator (i.e., the first discriminator network D1). The SPGAN also includes a second discriminator network D2. Further, the second discriminator network D2 compares the second synthetic image generated by the second generator network G_B with the source images to determine whether second synthetic image is real or fake. Accordingly, the SPGAN tries to "fool" the second discriminator network D2 by producing a synthetic image that appear to have come from a true data distribution of the source image domain (i.e., an image captured by a camera). During training of the SPGAN, the second discriminator network D2 learns to distinguish the second synthetic image from real images in the source domain. During training, the second generator network G_B learns a mapping from the target image to the source style and trains to produce synthetic source samples that fool an adversarial discriminator (i.e., the second discriminator network D2).

After block 104, the method 100 proceeds to block 106. At block 106, the first encoder $G_{E1}$ of the first generator network G_A extracts the source-semantic feature data from the source semantic content of the source image. Then, the method 100 proceeds to block 108. At block 108, the source-semantic feature data is inputted to the first decoder Gm. Then, the method 100 proceed to block 110. At block 110, the first decoder Gm generates (i.e., outputs) a first synthetic image. The first synthetic image includes synthetic image data. The first synthetic image includes some or all of the source semantic content of the source image in a target style using the source-semantic feature data extracted by the first encoder of the first generator network. The term "style" means the spatially-average colors and a texture of an image, such as white balance, color saturation, image brightness, etc. Thus, the term "target style" means the spatially-average colors and a texture of target images, such as white balance, color saturation, image brightness, etc. The target image includes target image data. The first synthetic image includes first-synthetic feature data. The term "first-synthetic feature data" means data about the first-synthetic semantic content of the first synthetic image. The term "first-synthetic semantic content" means objects (e.g., cars, building, trees, etc.) in the first synthetic image and the arrangement of the objects in the first synthetic image. Therefore, the first-synthetic semantic content includes first-synthetic feature data. Then, the method 100 proceeds to block 112.

At block 112, the first synthetic image is inputted to the first encoder $G_{E1}$ of the first generator network G_A. Then, the method 100 proceeds to block 114. At block 114, the first encoder $G_{E1}$ extracts the first-synthetic feature data from the first synthetic image. Then, the method 100 proceeds to block 116.

At block 116, the processor 44 determines (i.e., calculates) a first encoder loss using the source-semantic feature data and the first-synthetic feature data to accelerate training. The first generator network G_A may be considered as an encoder following by a decoder, in which the encoder may be viewed as sketchy content representation to extract the core semantic features from the input. To keep the semantic content before and after generator, the encoder loss function with Equation 1. Therefore, the processor may use Equation 1 to calculate the first encoder loss:

$$L_{E_S}(G_{S \to T}, X_S) = E_{x_s \sim X_S} \left[ \frac{1}{d} \| G_E(x) - G_E(G_D(G_E(x))) \|_2^2 \right] \quad (1)$$

where:

x is the input image (e.g., the source image);

$G_E$ (X) is the encode output of the input image, i.e. the feature of the input image (the source-semantic feature data);

$G_D(G_E(X))$ is the styled image (e.g., the first synthetic image);

$G_E$ ($G_D(G_E(x))$) is the feature of the styled image (the first-synthetic feature data)

$L_{E_S}(G_{S \to T}, X_S)_E$ is the encoder loss (e.g., the first encoder loss) and it is the difference between the feature of original image and the styled image;

d is the dimension of the image feature, i.e., $G_E(X)$;

$X_S$ is the image set in the source domain (image set of the source image);

$x_s$ is a data point in the source domain (an image in the source image domain);

$x_s \sim X_S$ is the data distribution in the source domain (e.g., data distribution in the source image domain); and E is the expectation.

Then, the method 100 proceeds to block 118. At block 118, the first synthetic image (and therefore the first synthetic image data) is inputted into the first discriminator network D1. The method 100 also includes block 120. At block 120, the processor 44 receives the target images. Then, at block 120, the target images (and therefore the target image data) is inputted into the first discriminator network D1. Then, the method 100 proceeds to block 122. At block 122, first discriminator network D1 attempts to classify that target image data from the first synthetic image data. Then, the method 100 continuous to block 124.

At block 124, the first discriminator network D1 determines and outputs a first Generative Adversarial Network (GAN) loss. The processor 44 may calculates the first GAN loss with Equation 2:

$$L_{GAN}(G_{S \to T}, D_T, X_S, X_T) = E_{x_T \sim X_T}[\log D_T(x_t)] + E_{x_s \sim X_S}[\log(1 - D_T(G_{S \to T}(x_s)))] \quad (2)$$

where:

$L_{GAN}(G_{S \to T}, D_T, X_S, X_T)$ is the first GAN loss;

$G_{S \to T}$ is the generator from the source domain S to the target domain T;

$D_T$ is the discriminator in the target domain T;

$X_S$ is the image set in the source domain;

$X_T$ is the image set in the target domain;

$x_t$ is a data point in target domain (an image in the target image set);

$x_s$ is a data point in the source domain (an image in the source image set);

$x_t \sim X_T$ is the data distribution in the target;

$x_s \sim X_S$ is the data distribution in the source domain; and

E is the expectation.

The method 100 then proceeds to block 126. At block 126, the processor 44 inputs the first synthetic image into the second encoder $G_{E2}$ of the second generator network G_B. At this point, the second encoder $G_{E2}$ encodes the content of the input image and generates the features of the first synthetic image. Then, the method 100 proceeds to block 128.

At block 128, the second encoder $G_{E2}$ of the second generator network G_B extracts the first-synthetic feature data from a first-synthetic semantic content of the first synthetic image. The first synthetic image includes first synthetic image data. The first synthetic image includes a first-synthetic semantic content. The term "semantic content" means objects (e.g., cars, building, trees, etc.) in the image and the arrangement of the objects in an image. Thus, the term "first-synthetic semantic content" means objects (e.g., cars, building, trees, etc.) in the first synthetic image and the arrangement of the objects in the first synthetic image. The first-synthetic content includes the first-synthetic feature data. The term "first-synthetic feature data" means data about the first-synthetic semantic content of the first synthetic image. After block 128, the method 100 proceeds to block 130.

At block 130, the first-synthetic feature data is inputted to the second decoder $G_{D2}$. Then, the method 100 proceed to block 132. At block 132, the second decoder $G_{D2}$ generates (i.e., outputs) a second synthetic image. The second synthetic image includes second synthetic image data. The second synthetic image includes some or all of the second-synthetic semantic content of the second synthetic image in a source style using the first-synthetic semantic feature data extracted by the second encoder $G_{E2}$ of the second generator network G_B. Thus, the term "source style" means the spatially-average colors and a texture of the source image, such as white balance, color saturation, image brightness, etc. The source image includes source image data. The second synthetic image includes second-synthetic feature data. The term "second-synthetic feature data" means data about the second-synthetic semantic content of the second synthetic image. The term "second-synthetic semantic content" means objects (e.g., cars, building, trees, etc.) in the second synthetic image and the arrangement of the objects in the second synthetic image. Therefore, the second-synthetic semantic content includes second-synthetic feature data. Then, the method 100 proceeds to block 134.

At block 134, the second synthetic image is inputted to the second encoder $G_{E2}$ of the second generator network G_A. Then, the method 100 proceeds to block 136. At block 136, the second encoder $G_{E2}$ extracts the second-synthetic feature data from the second synthetic image. Then, the method 100 proceeds to block 138.

At block 138, the processor 44 determines (i.e., calculates) a second encoder loss using the first-synthetic semantic feature data and the second-synthetic feature data to accelerate training. To do so, the processor may use equation similar to Equation 1 above.

Then, the method 100 proceeds to block 140. At block 140, the second synthetic image (and therefore the second synthetic image data) is inputted into the second discriminator network D2. The method 100 also includes block 142. At block 142, the source images (and therefore the source image data) is inputted into the second discriminator network D2. Then, the method 100 proceeds to block 144. At block 144, second discriminator network D2 attempts to classify that the first synthetic image data from the source image data. Then, the method 100 continuous to block 146. At block 146, the second discriminator network D1 determines and outputs a second GAN loss. The processor 44 may calculates the second GAN loss with equations similar to Equation 2. Then, the method 100 proceeds to block 148.

At block 148, the processor 44 determines the cycle loss. In order to encourage the source content to be preserved during the conversion process, a cycle-consistency constraint is introduced to map from target domain and back to the source domain reproducing the original sample. Thus, at block 148, the processor 44 may calculate the cycle loss using Equation 3:

$$L_{cyc}(G_{S \to T}, G_{T \to S}, X_S, X_T) = E_{x_t \sim X_T}[\|G_{S \to T}(G_{T \to S}(x_t)) - x_t\|_1] + E_{x_s \sim X_S}[\|G_{T \to S}(G_{S \to T}(x_s)) - x_s\|_1] \quad (3)$$

where:

$L_{cyc}(G_{S \to T}, G_{T \to S}, X_S, X_T)$ is the cycle loss;

$\|\ \|_1$ is the $l_1$ norm;

$G_{S \to T}$ is the generator from the source domain S to the target domain T (e.g., the first generator network G_A);

$G_{T \to S}$ is the generator from the target domain T to the source domain S (e.g., the second generator network G_B);

$X_S$ is the image set in the source domain;

$X_T$ is the image set in the target domain;

$x_t$ is a data point in target domain (an image in the target image set);

$x_s$ is a data point in the source domain (an image in the source image set);

$x_t \sim X_T$ is the data distribution in the target domain;

$x_s \sim X_S$ is the data distribution in the source domain; and

E is the expectation.

Also, at block 148, the processor 44 determines (e.g., calculates) a total loss as a function of the first encoder loss, the second encoder loss, the first GAN loss, the second GAN loss and the Cycle loss. For example, the processor 44 may calculate the total loss using Equation 4:

$$L_{total}(G_{S \to T}, G_{T \to S}, D_T, D_S, X_S, X_T) = L_{GAN}(G_{S \to T}, D_T, X_S, X_T) + L_{GAN}(G_{T \to S}, D_S, X_S, X_T) + L_{cyc}(G_{S \to T}, G_{T \to S}, X_S, X_T) + L_{E_S}(G_{S \to T}, X_S) + L_{E_T}(G_{T \to S}, X_T) \quad (4)$$

where:

$L_{total}(G_{S \to T}, G_{T \to S}, D_T, D_S, X_S, X_T)$ is the total loss;

$L_{GAN}(G_{S \to T}, D_T, X_S, X_T)$ is the GAN loss from the source domain to the target domain (i.e., the first GAN loss);

$L_{GAN}(G_{T \to S}, D_S, X_S, X_T)$ is the GAN loss from the target domain to the source domain (i.e., the second GAN loss);

$L_{cyc}(G_{S \to T}, G_{T \to S}, X_S, X_T)$ is the cycle loss;

$L_{E_s}(G_{S \to T}, X_S)$ is the encoder loss from the source domain to the target domain (i.e., the first encoder loss);

$L_{E_T}(G_{T \to S}, X_T)$ is the encoder loss from the target domain to the source domain (i.e., the second encoder loss);

The first GAN loss and the second GAN loss plus the cycle loss are the same as existing CycleGAN.

The method 100 is an iterative process. Therefore, by repeating this method 100 iteratively, the processor 44 trains the first generator network G_A, the first discriminator network D1, the second generator network G_B, and the second discriminator network D2 using the first encoder loss, the second encoder loss the first GAN loss, and second GAN loss until the total loss is equal to or less than a predetermined loss threshold or reach the maximum number of iterations in order to minimize image distortion during the image style transfer. During training of the SPGAN, the first discriminator network D1 learns to distinguish the synthetic image generated by the first generator network G_A from the real target images. During training, the first generator network G_A learns a mapping from the source image to the target style and trains to produce target samples that fool an adversarial discriminator (i.e., the first discriminator network D1). During training, the second generator network G_B learns a mapping from the target image to the source style and trains to produce target samples that fool an adversarial discriminator (i.e., the second discriminator network D2). It is envisioned that the first generator network G_A and/or the second generator network G_B may be multi-stage generators in order to increase the encoder's ability to represent the content features from the input. After the training is completed (i.e., when total loss is equal to or less than a predetermined loss threshold), the first generator network G_A may be integrated into the control system 98 for image style transfer.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for image style transfer using a Semantic Preserved Generative Adversarial Network (SPGAN), comprising:
    receiving, by a processor, a source image, wherein the source image was captured by a camera, the source image includes a source semantic content, and the source semantic content includes objects in the source image and an arrangement of the objects in the source image;
    inputting the source image into the SPGAN, wherein the SPGAN includes a first generator network including a first encoder and a first decoder, and a first discriminator network, wherein the SPGAN runs on the processor;
    extracting, by the first encoder of the first generator network, a source-semantic feature data from the source semantic content of the source image;
    generating, by the first decoder of the first generator network, a first synthetic image including the source semantic content of the source image in a target style of a target image using the source-semantic feature data extracted by the first encoder of the first generator network, wherein the target style is a spatially-average colors and a texture of the target image, and the first synthetic image includes first-synthetic feature data;
    determining, by the processor, a first encoder loss using the source-semantic feature data and the first-synthetic feature data;
    discriminating, using the first discriminator network, the first synthetic image generated by the first generator network against the target image to determine a GAN loss;
    determining a total loss as a function of the first encoder loss and the GAN loss; and
    training, by the processor, the first generator network and the first discriminator network using the first encoder loss and the GAN loss until the total loss is equal to or less than a predetermined loss threshold or reach the maximum number of training iterations in order to minimize image distortion during the image style transfer.

2. The method of claim 1, further comprising receiving, by the processor, the target image.

3. The method of claim 2, further comprising inputting the first synthetic image into a second generator network, wherein the second generator network includes a second encoder and a second decoder, and the first synthetic image has a first-synthetic semantic content, and the first-synthetic semantic content is objects in the first synthetic image and an arrangement of the objects in the first synthetic image.

4. The method of claim 3, further comprising extracting, by the second encoder of the second generator network, a first-synthetic feature data from a first-synthetic semantic content of the first synthetic image.

5. The method of claim 4, further comprising generating, by the second decoder of the second generator network, a second synthetic image including the first-synthetic semantic content of the first synthetic image in a source style of the source image using the first-synthetic feature data extracted by the second encoder of the second generator network, wherein the source style is a spatially-average colors and a texture of the source image, wherein the second synthetic image has a second-synthetic feature data.

6. The method of claim 5, further comprising determining, by the processor, a second encoder loss using the first-synthetic feature data and the second-synthetic feature data.

7. The method of claim 6, wherein the GAN loss is a first GAN loss, and the total loss is a function of the first encoder loss, the second encoder loss, and the first GAN loss and a second GAN loss.

8. The method of claim 7, further comprising determining a cycle loss using the second-synthetic feature data and a source image synthetic data.

9. The method of claim 8, wherein the total loss is a function of the first encoder loss, the second encoder loss, the first GAN loss, the second GAN loss and the cycle loss.

10. The method of claim 9, further comprising inputting the second synthetic image into the second generator network.

11. The method of claim 9, wherein the camera is part of a vehicle.

12. A system for image style transfer using Semantic Preserved Generative Adversarial Network (SPGAN), comprising:
    a plurality of sensors, wherein at least one of the sensors is a camera;
    a processor in communication with the plurality of sensors;
    wherein the processor is programmed:

receive a source image, wherein the source image was captured by a camera, the source image includes a source semantic content, and the source semantic content is objects in the source image and an arrangement of the objects in the source image;

input the source image into the SPGAN, wherein the SPGAN includes a first generator network including a first encoder and a first decoder, and a first discriminator network, wherein the SPGAN runs on the processor;

extracting, by the first encoder of the first generator network, a source-semantic feature data from the source semantic content of the source image;

generate, by the first decoder of the first generator network, a first synthetic image including the source semantic content of the source image in a target style of a target image using the source-semantic feature data extracted by the first encoder of the first generator network, wherein the target style is a spatially-average colors and a texture of the target image, and the first synthetic image includes first-synthetic feature data;

determine a first encoder loss using the source-semantic feature data and the first-synthetic feature data;

discriminate, using the first discriminator network, the first synthetic image generated by the first generator network against the target image to determine a GAN loss;

determine a total loss as a function of the first encoder loss and the GAN loss; and train the first generator network and the first discriminator network using the first encoder loss and the GAN loss until the total loss is equal to or less than a predetermined loss threshold or reach the maximum number of training iterations in order to minimize image distortion during the image style transfer.

13. The system of claim 12, wherein the processor is programmed to receive the target image.

14. The system of claim 13, wherein the processor is programmed to input the first synthetic image into a second generator network, wherein the second generator network includes a second encoder and a second decoder, and the first synthetic image has a first-synthetic semantic content, and the first-synthetic semantic content is objects in the first synthetic image and an arrangement of the objects in the first synthetic image.

15. The system of claim 14, wherein the processor is programmed to extract, by the second encoder of the second generator network, a first-synthetic feature data from a first-synthetic semantic content of the first synthetic image.

16. The system of claim 15, wherein the processor is programmed to generate, by the second decoder of the second generator network, a second synthetic image including the first-synthetic semantic content of the first synthetic image in a source style of the source image using the first-synthetic feature data extracted by the second encoder of the second generator network, wherein the source style is a spatially-average colors and a texture of the source image, wherein the second synthetic image has a second-synthetic feature data.

17. The system of claim 16, wherein the processor is programmed to determine a second encoder loss using the first-synthetic feature data and the second-synthetic feature data.

18. The system of claim 17, wherein the GAN loss is first GAN loss, and the total loss is a function of the first encoder loss, the second encoder loss, and the first GAN loss and a second GAN loss.

19. The system of claim 18, wherein the processor is programmed to determine a cycle loss using the second-synthetic feature data and source-semantic feature data.

20. The system of claim 19, wherein the total loss is a function of the first encoder loss, the second encoder loss, the first GAN loss, the second GAN loss, and the cycle loss, the processor is programmed to input the second synthetic image into the second generator network, and the camera is part of a vehicle.

* * * * *